UNITED STATES PATENT OFFICE.

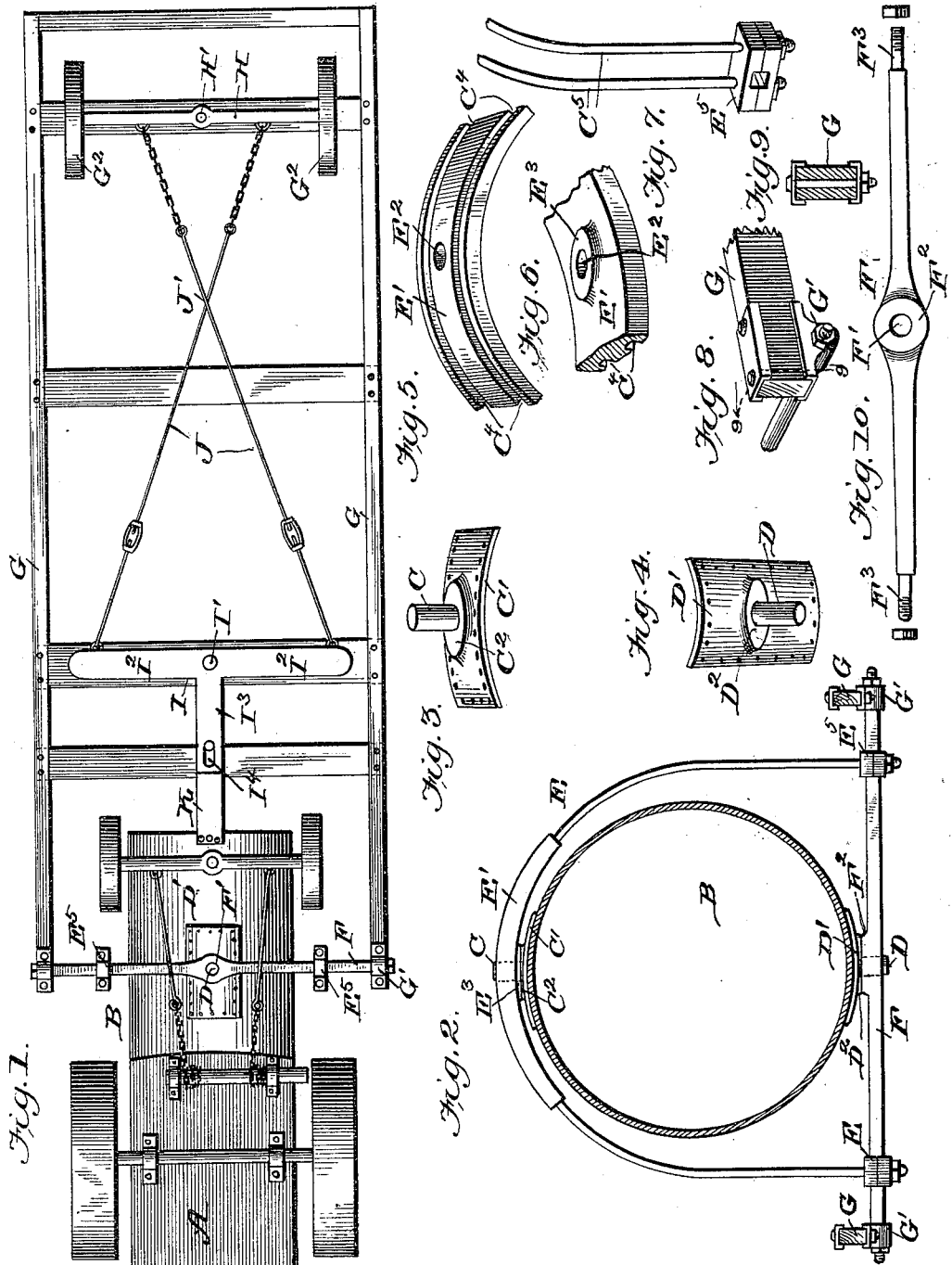

AMBROSE M. SEARLE, OF GENESEO, ILLINOIS.

TRACTION-ENGINE.

SPECIFICATION forming part of Letters Patent No. 643,009, dated February 6, 1900.

Application filed June 30, 1899. Serial No. 722,418. (No model.)

*To all whom it may concern:*

Be it known that I, AMBROSE M. SEARLE, residing at Geneseo, in the county of Henry and State of Illinois, have made certain new and useful Improvements in Traction-Engines, of which the following is a specification.

My invention is an improvement in traction-engines, and relates particularly to the construction of the two-wheel base and the means for connecting the same with the engine and for steering it automatically by the movements of the engine; and the invention consists in certain novel constructions and combinations of parts, as will be hereinafter described, and pointed out in the claims.

In the drawings, Figure 1 is a bottom plan view of a traction-engine embodying my improvements. Fig. 2 is a cross-sectional view on about line 2 2 of Fig. 1. Figs. 3 and 4 are detail views of the upper and lower studs or tenons and their plates. Fig. 5 is a detail view of the crown-plate or saddle of the harness. Fig. 6 is a detail view of a portion of the under side of said saddle. Fig. 7 is a detail view illustrating the rods which cross and seat in the groove of the saddle. Fig. 8 illustrates the connection between the side bars of the two-wheel base and the yoke. Fig. 9 is a detail view on about line 9 9 of Fig. 8, and Fig. 10 is a detail view of the yoke.

The traction-engine A may in general respects be of ordinary construction, having the boiler B. Pivot studs or tenons C and D project from respectively the upper and lower sides of the boiler and form pivots for the harness which connects the two-wheel base with the engine. The studs C and D are mounted on plates C' and D', which may be riveted to the boiler, and bosses or enlargements $C^2$ and $D^2$ are formed around the bases of the studs, providing bearings for the arch and yoke, presently described.

The arch E is formed with a saddle E', having a perforation $E^2$ to fit on the stud C, a boss $E^3$ to rest on the boss $C^2$, and grooves $C^4$ to receive the rods $C^5$, which extend down on opposite sides of the boiler and are provided at their lower ends with boxes $E^5$, by which they are connected with the yoke F. This yoke F has the central opening F', fitting on the stud D, and the boss $F^2$, bearing on the boss $D^2$, and is provided at its ends with the journals $F^3$, on which are supported the ends of the side bars G of the two-wheel base. In supporting the side bars on the yoke F, I employ the boxes G', which are clipped to the ends of the side bars G, as shown in Figs. 8 and 9. By the described construction I form a strong and simple harness for supporting one end of the base, the other end of the base being supported on the two wheels $G^2$, mounted on the axle H, which is pivoted centrally at H'. It will be noticed that the harness swings laterally on its vertical pivots, and the two-wheel base has a vertical swinging movement on the ends of the yoke F.

In steering the two-wheel base I employ a T-shaped lever I, which is pivoted at I' and has its arms $I^2$ connected by the rods or links J, which are crossed at J', with the axle H on opposite sides of its pivot H', so the rocking of the lever I on its pivot I' will turn the axle H to steer the two-wheel base. The lever I has its arm or shank $I^3$ provided with a slot $I^4$, which is entered by a stud on a bar K, fixed to and extending from the boiler B of the traction-engine, so the movements of the boiler to one side or the other will operate to tilt the lever I to effect the steering of the two-wheel base as is desired.

The construction, as before described, provides a pivotal connection for attaching one end of an adjustable two-wheel base to a traction-engine, thus making it possible to sustain the weight of that end of the adjustable base and also the weight of the load which may be carried upon that part of the said base, at the same time allowing the engine perfect freedom in its movements as regards its steering or guiding apparatus and in the performance of its other operations. It will also be seen that the action and position of the boiler of the engine control the guiding device of the two-wheel base, and the base is so arranged as to travel in front of instead of trailing behind the engine, this resulting from the positive operation of the steering devices by the movements of the boiler.

Having thus described my invention, what I claim, and desire to secure by Letters Patent, is—

1. A traction-engine having front and rear wheels, combined with the two-wheel base pivotally connected to said engine between its front and rear wheels, and steering devices between the engine and the wheels of the base substantially as set forth.

2. In a traction-engine the combination of the boiler, the plates secured to the upper and lower sides thereof and provided with the vertical tenons or studs, the harness pivoted on said studs and provided with lateral journals, the base supported at one end on said lateral journals and at its other end on its wheels, and steering devices connecting said wheels with the boiler substantially as set forth.

3. The combination with a traction-engine and a two-wheel base, of a harness, vertical pivots for connecting or attaching such base to the engine and steering connections between the engine and the wheels of the base substantially as set forth.

4. In a traction-engine, the combination with the engine and the base having the wheels and the pivoted axle at one end and supported at its other end on the engine, the pivoted T-shaped lever, crossed connections between the arms of said lever and the pivoted axle, and operating connections between the said lever and the engine substantially as set forth.

5. The combination with the engine-boiler and vertical studs projecting from the upper and lower sides thereof, of the base, wheels supporting one end of the base, a harness pivoted on the said vertical studs and supporting the other end of the base, and steering connections between the boiler and the wheels of the base substantially as set forth.

6. In an apparatus substantially as described the combination of the upper and lower pivot-studs, the yoke pivoted on one of said studs, the grooved saddle pivoted on the other stud, the rods or bars fitting in the grooves of the saddle and connected at their ends with the yoke, and the base supported on said yoke substantially as set forth.

7. In a traction-engine the combination with the boiler and the two-wheel base, of the harness embracing and pivoted vertically to the boiler and supporting one end of the two-wheel base, and devices whereby the movement of the boiler effects the steering of the two-wheel base, substantially as set forth.

AMBROSE M. SEARLE.

Witnesses:
VICTOR W. CLOUGH,
HENDRICK V. FISHER.